United States Patent [19]
McNeel

[11]  4,128,220
[45]  Dec. 5, 1978

[54] FLEXIBLE STRAP SUPPORT FASTENER
[75] Inventor: William O. McNeel, Houston, Tex.
[73] Assignee: Geo Space Corporation, Houston, Tex.
[21] Appl. No.: 783,059
[22] Filed: Mar. 31, 1977
[51] Int. Cl.² .............................................. F16L 3/12
[52] U.S. Cl. ................................... 248/60; 24/16 PB; 24/73 PB; 248/74 PB
[58] Field of Search ................. 248/51, 60, 61, 74 PB, 248/302, 303, 69, 90, 91; 24/16 PB, 17 AP, 30.5 P, 73 PB, 268, 206 A; 191/12 R

[56]        References Cited
       U.S. PATENT DOCUMENTS

| 890,653 | 6/1908 | Howard | 248/91 |
|---|---|---|---|
| 2,407,737 | 9/1946 | Erasmus | 248/61 X |
| 3,147,523 | 9/1964 | Logan | 24/30.5 P X |
| 3,149,808 | 9/1964 | Weckesser | 248/74 PB |
| 3,289,983 | 12/1966 | Mennerdahl | 248/60 |
| 3,300,825 | 1/1967 | Andreasen | 24/73 PB X |
| 3,494,002 | 2/1970 | Kabel | 24/16 PB |
| 3,568,262 | 3/1971 | Woldman | 248/74 PB X |
| 3,581,347 | 6/1971 | Verspieren | 248/74 PB X |
| 3,802,654 | 4/1974 | Jenko et al. | 248/74 PB X |
| 3,909,884 | 10/1975 | Weckesser | 248/74 PB X |
| 4,001,919 | 1/1977 | Moberg et al. | 24/16 PB |
| 4,008,512 | 2/1977 | Prodel | 24/16 PB |

FOREIGN PATENT DOCUMENTS

| 1144133 | 10/1957 | France | 248/60 |
|---|---|---|---|
| 2436054 | 2/1976 | Fed. Rep. of Germany | 191/12 R |
| 1485233 | 5/1967 | France | 248/69 |

Primary Examiner—Rodney H. Bonck
Attorney, Agent, or Firm—Daniel J. Meaney, Jr.

[57] ABSTRACT

A flexible strap support fastener including a hanger ring having means defining a cavity at an edge thereof and having a first opening and a second opposed aligned opening with at least one wall of the cavity being formed into a ramp, a wedge-shaped locking member adapted to be inserted into the cavity and having a thin end which extends through the second opening, a thick end which extends through the first opening, a sloping surface which engages the ramp surface and a planar surface of a predetermined transverse width having ridges formed across the width thereof pointing toward the first opening, a flexible strip forming an integral unit between the locking member and the ring and a flexible strap having an elongated recessed central area having ridges located on the surface of the recessed area and with one strap end affixed to the ring between the first opening and the second opening with the ridges in the recessed area pointed towards the first opening and the other strap end being adapted to be wrapped around an article and inserted into the second opening and pulled between the locking member and cavity wall, out the first opening, mating the locking member in the recessed central area and unilaterally sliding the teeth in the recessed area of the strap over the teeth of the locking member which lock when the strap is secure around an article.

6 Claims, 13 Drawing Figures

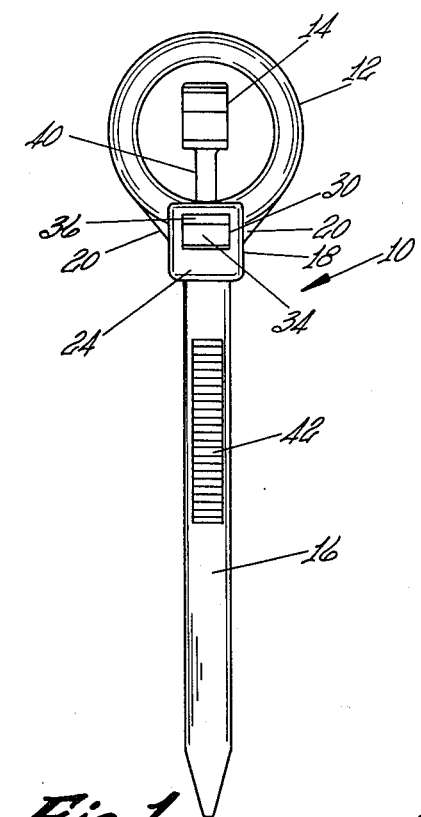
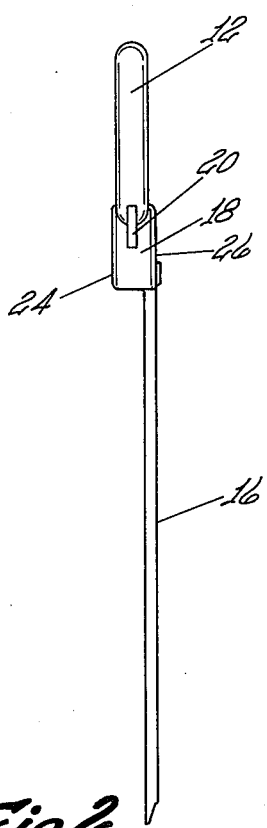
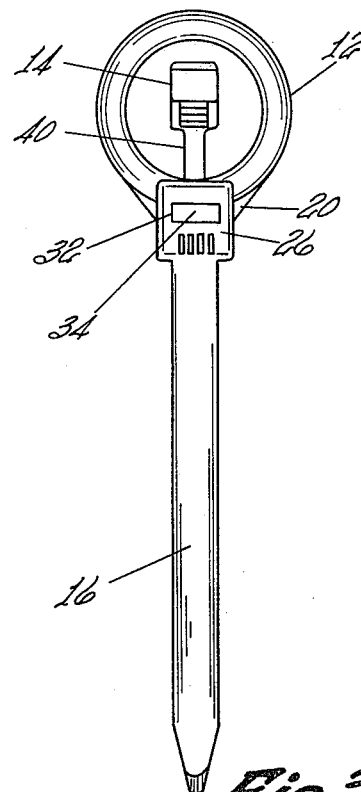
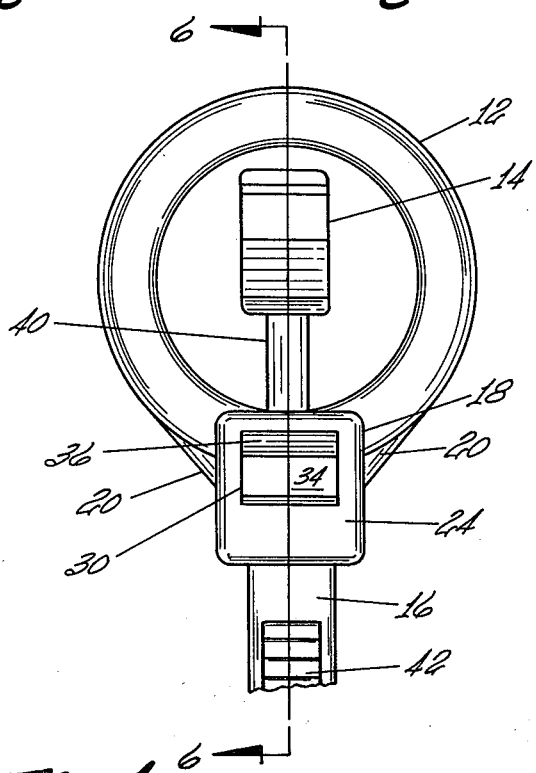
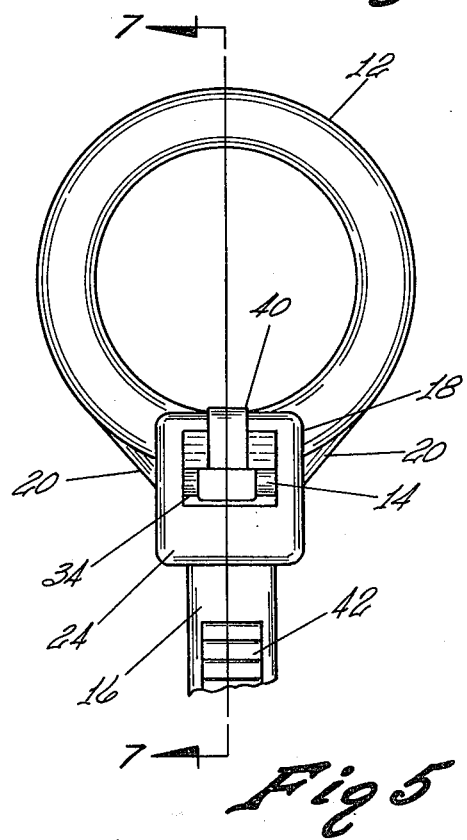

4,128,220

FLEXIBLE STRAP SUPPORT FASTENER

BACKGROUND OF THE INVENTION

1. Field of the Invention

This invention relates to a novel and improved flexible adjustable holding means and specifically to a ring shaped connector having a flexible strap for attachment to an article, such as an electrical cable, to enable the article to be attached to a support.

This invention has utility in the geophysical industry. Electrical cables and electrical cables with geophones electrically connected thereto are used in seismic acquisition systems for generating and recording seismic data. The distribution and retrieving of cables is a major activity in the gathering of seismic data. The ring shaped connector can be used in combination with a hasp as an assembly to efficiently store and retrieve electrical cables.

2. Disclosure of the Prior Art

It is known in the prior art to utilize fasteners which are attached to electrical cables. One such known fastener is a metal loop, or "D-ring" which is formed into a "U-shaped" member wherein the two ends thereof are formed into a small loop end in a plane perpendicular to the plane of the "U-shaped" loop. The cable to be attached is passed through each small loop end and the loop is crimped against the cable. The cable forms the back part of the "D-ring" and the metal "U-shaped" member forms the front part of the "D-ring". The "D-rings" with attached electrical cables are strung onto a hasp formed of a large elongated rigid member which cooperates with a hasp handle and fastener, which fastener is in the form of a "V-shaped" end, which receives and holds the elongated rigid member in a closed position. The hasp may be opened, the "D-rings" with cable removed and distributed, thereby avoiding tangling or twisting of the cable or disturbance of the "planted" geophone. For storage, the "D-rings" with cables are stored by sliding each metal portion of the "D-rings" onto the elongated rigid member of the hasp and to form cable loops, with or without geophones as the case may be, which hang from and are stored on the hasp.

It is also known in the art to utilize so called "one-way" strapping devices for fixedly joining cables in electrical systems. Generally, the strapping devices form a number of single conductors into a cable-type assembly or join several cables together for neatness and structural rigidity.

Further, it is known in the medical field to use non-removeable patient identification tags or bracelets which are attached to a patient's wrist or leg. Such identification tags utilize a strap arrangement to form a loop which is larger than the wrist or leg to permit movement or sliding of the identification tag therebetween.

SUMMARY OF THE INVENTION

The present invention overcomes certain of the disadvantages of the prior art metal fasteners. The so called "D-ring", metal loop fasteners require special crimping tools to close the loop to form a tight fit around the exterior of the cable. If the metal loop is crimped too tightly, then the insulation is severed and the internal conductors, which may or may not be covered with insulation, are exposed.

In the field, the metal loops may be subjected to unusual pressure, such as being stepped on or run over by a heavy vehicle. This results in the "D-ring" being bent, deformed or causing the metal to cut the cable.

Other known strap type fasteners, which function to hold cables together, fail to provide a rugged attaching ring holder which can be continually inserted on and removed from a holder. Also, such fasteners are not designed for field use. When such cable binding devices are subjected to separation forces, the fastener can easily be separated from the cable.

The present invention discloses a ruggedized, flexible strap support fastener. Once the fastener is attached to the cable, it can normally be removed only by cutting the strap portion of the fastener. Attachment of a fastener, which incorporates the teaching of this invention, is easily accomplished by wrapping the strap around the cable, pulling the end of the strap through an opening and then pulling the strap tightly against the cable. A multiplicity of teeth on the strap and a multiplicity of teeth on a wedge locking member inserted onto the opening in the pad on the ring housing, cooperate to slide easily in one direction in response to a pulling force tightening the strap around the cable. However, when a separation force is applied to the cable or strap causing the cable/strap arrangement to separate, the teeth lock holding the strap tightly against the cable. This prevents the fastener from separating from the cable or from sliding thereon.

One other advantage of the present invention is that the flexible strap support fastener is constructed of a tough pliable glass filled nylon and yields to pressures from being stepped on or in being run over by a heavy vehicle thereby avoiding severing the cable or damaging the installation therearound.

Yet another advantage is that a fastener, if cut or otherwise damaged, can be easily and quickly replaced in the field.

BRIEF DESCRIPTION OF THE DRAWING

The foregoing and other advantages and features of the invention will become apparent from the following description of the preferred embodiment when considered together with the illustration in the accompanying drawing which includes the following figures:

FIG. 1 is a front view of an unassembled flexible strap support fastener with a wedge locking member located within the center of a ring holder;

FIG. 2 is a side view of the fastener of FIG. 1;

FIG. 3 is a back view of the fastener of FIG. 1;

FIG. 4 is an enlarged front view of the ring holder, pad and wedge locking member of FIG. 1;

FIG. 5 is an enlarged front view of the ring holder of FIG. 1 wherein the wedge locking member is inserted into the pad.

DESCRIPTION OF THE PREFERRED EMBODIMENT

Figure 6:
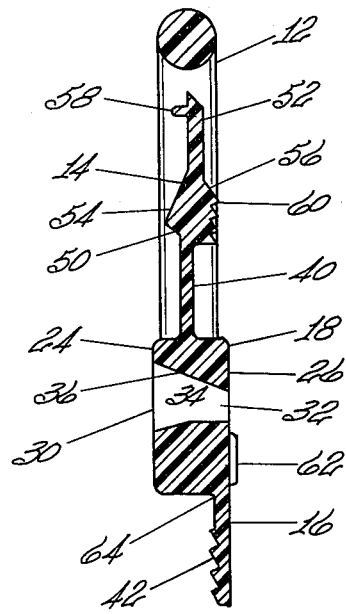
FIG. 6 is a sectional view of ring holder and pad taken along section lines 6—6 of FIG. 4.

FIGS. 1, 2 and 3 show a flexible adjustable holding means in the preferred embodiment in an unassembled position of a means for fastening an article to a support. The preferred embodiment is a flexible strap support device or cable ring fastener generally referred to as 10.

The flexible adjustable holding means has three elements; namely, a means defining a hanger including a cavity, such as a hanger ring 12 of fastener 10, a wedge shaped locking means, such as the wedge locking member 14, and an elongated strap member, such as strap 16.

The means defining a hanger includes a cavity communicating between a first opening and a second opening. In FIGS. 1, 2 and 3, the hanger ring 12 includes a pad 18 which is attached to the periphery of the ring 12 and supported by a fillet section 20 for structural rigidity.

Pad 18 has a first surface 24 and a second opposed surface 26. In the preferred embodiment, the first surface 24 has a first opening, such as a first rectangular shaped opening 30 shown in FIG. 1. The second surface 26 has a second opening, such as a second smaller rectangular shaped opening 32 shown in FIG. 3.

A cavity 34 extends through the interior of pad 18 between the openings 30 and 32. The interior wall of cavity 34 located nearest the periphery of hanger ring 12 is formed into a ramp surface shown as 36 in FIG. 1.

The wedge-shaped locking means includes means defining a sloping surface and planar surface, which sloping surface is adapted to engage with the ramp surface 36. This is shown in greater detail in FIGS. 6 and 7.

A flexible strap 40 is connected between the interior of connector ring 12 and wedge locking member 14, forming an integral unit between the elements.

The strap 16 has plurality of ridges 42 which cooperate with the wedge locking member 14 when the connector is assembled.

FIG. 4 shows the hanger ring 12, pad 18 and wedge locking member 14 relationship in greater detail prior to assembly. The first rectangular opening 30 is of sufficient geometrical dimension to receive and pass the wedge locking member 14 therethrough.

FIG. 5 shows the wedge locking member 14 inserted into cavity 34. The flexible strap 14 bends around the pad 18 and remains on the exterior of the pad 18.

The cross-sectional view of FIG. 6 shows the unassembled hanger ring 12, pad 18 and wedge locking member 14 together with certain of the other elements shown in FIGS. 1 to 4. In particular, the wedge locking member 14 construction and the cavity 34 interior wall construction, are shown in greater detail.

The wedge-shaped locking means, such as the wedge locking member 14, has thick end 50, a thin end 52, a sloping surface 54 and a substantially planar surface 56. The planar surface 56 has plurality of parallel, angular-shaped ridges, such as for example, sawtooth-shaped teeth 60. The angular teeth are pointed towards the thick end 50. In the preferred embodiment, the thick end 50 and sloping surface 54 are formed by a right angle triangle with the 90° angle forming the high point of the sloping surface 54. The wedge locking member 14 at its thin end 52 has a lip 58 formed therein for holding the wedge locking member 14 in the cavity 34.

Figure 7:
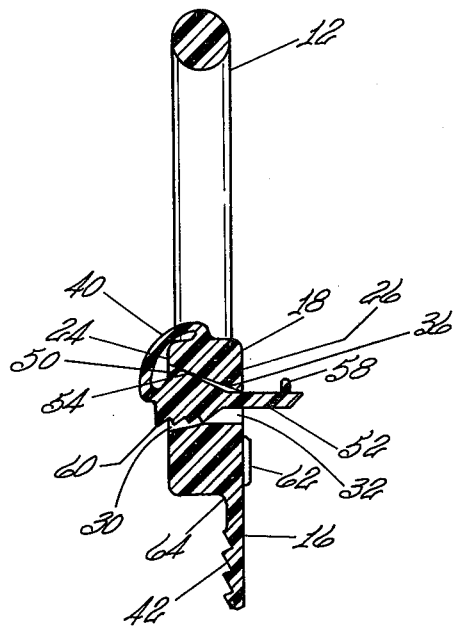
FIG. 7 is a sectional view of the ring holder and pad taken along section lines 7—7 of FIG. 5.

The cross-sectional view of FIG. 7 shows the wedge locking member 14 inserted into cavity 34. The cross-section view of FIG. 7 clearly shows the engagement between the ramp surface 36 of the wall forming cavity 34 and the sloping surface 54 of the wedge locking member 14. The teeth 60 of the wedge locking member 14 are slightly spaced from the adjacent wall of cavity 34. The teeth 60 point towards the first rectangular opening 30.

A plurality of spaced longitudinal gripping protrusions 62 are located on the pad on the second surface 26 below the second rectangular opening 32. The gripping protrusions 62 grip and hold the outer surface of an article to prevent slippage or removal of the article, such as an electrical cable, from the fastener 10.

The elongated strap member 16 is attached or joined to the pad 18 by end 64 between the first opening 30 and the second opening 32. In the preferred embodiment, the strap 16 is substantially flush with the second surface 26 with the points of teeth 42 facing and pointed towards the first surface 24 and the first rectangular opening 30.

Figure 8A:
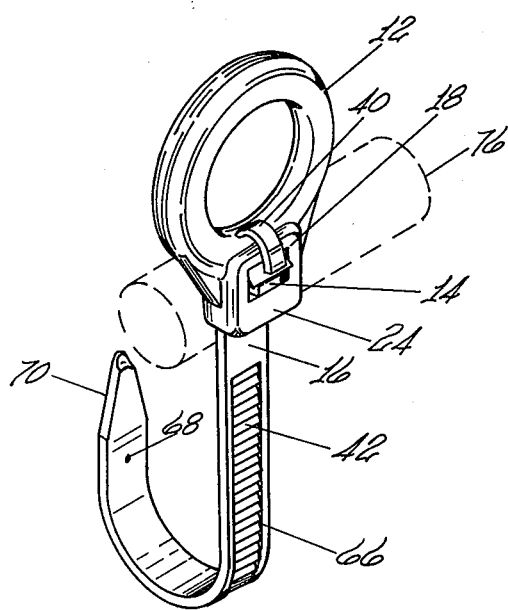
FIGS. 8(a), 8(b) and 8(c) are a series of pictorial representations of the steps of attaching the fastener to an article.
Figure 8B:
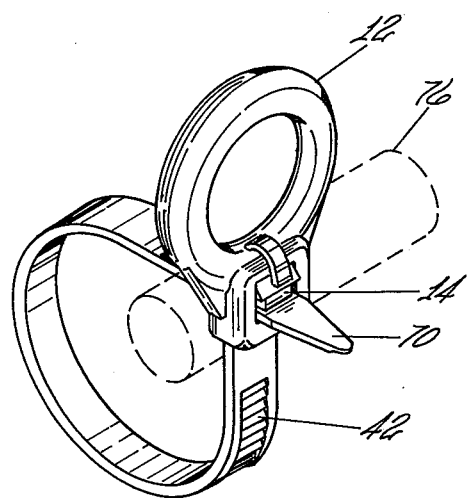
Figure 8C:
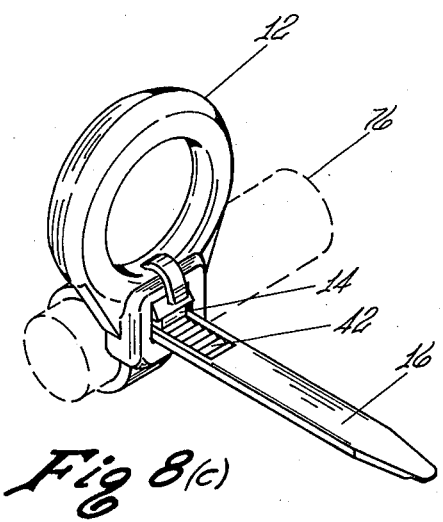

FIGS. 8(a), 8(b) and 8(c) show, in a series of steps, the sequence for attaching the fastener 10 to an article, such as an electrical cable. In FIGS. 8(a), 8(b) and 8(c), the strap 16 is shown to have a surface 66 which defines the plurality of parallel angular shaped ridges extending across the width of the strap member, such as the recessed teeth 42. The strap 16 is shown to have an opposed surface 68 and a free end 70. In FIG. 8(a), the wedge-shaped locking member 14 has been inserted into and is located in cavity 34. The hanger ring 12 is placed against an article, such as for example, an electrical cable illustrated in phantom as 76, with the second surface 26 and the second rectangular opening 32 against the cable 76. Thereupon, the free end 70 is passed around cable 76 to form a loop.

In FIG. 8(b), the next sequence shows that free end 70 has been inserted into the second rectangular opening 32, passed between the teeth 60 of wedge locking member 14 and the adjacent wall of cavity 34 and out the first rectangular opening 30. In FIG. 8(b), the teeth 42 on surface 66 of strap 16 have not engaged the teeth 60 of wedge locking member 14. At this point, the free end 70 can be removed from the cavity 34.

In FIG. 8(c), the sequence is shown after the free end 70 of strap 16 has been pulled in a direction through the second rectangular opening 32, between the wedge locking member 14 and wall of cavity 34, and out the first rectangular opening 30, a sufficient distance to bring the teeth 42 of strap 16 into engagement with the teeth 60 on the wedge locking member 14.

Figure 9:
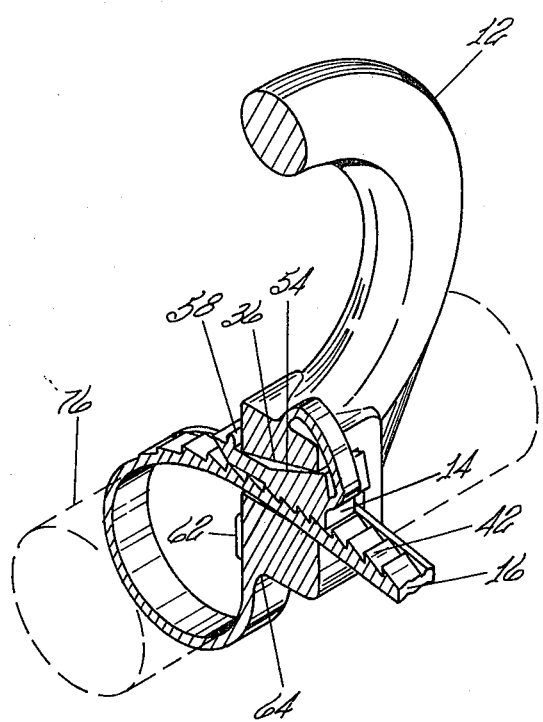
FIG. 9 is an enlarged view, partially in cross-section, showing the relationship between the ring holder, pad, wedge locking member and article when the fastener is tightly attached to an electrical cable.

FIG. 9 shows, in cross-section, the interaction between the strap 16 and wedge locking member 14. As the strap 16 is pulled in a direction through the second rectangular opening 32 (the second opening) between the teeth 60 of wedge locking member 14 and adjacent wall of cavity 34, and out the first rectangular opening 30 (the first opening), the teeth 42 of strap 16 unilaterally engage and slide across the teeth 60 of wedge-shaped member 14. This is due to the points of teeth 42 and teeth 60, both pointing toward the second rectangular opening 32. As the strap 16 is pulled in the direction towards the first rectangular opening 30, the teeth slide over each tooth surface. However, when a force is applied in an opposite direction, the teeth 42 engage and lock against the teeth 60 due to the straight position of the sawtooth shaped teeth becoming engaged. This engagement urges the wedge locking member 14 towards the second rectangular opening 32 causing the sloping surface 54 to intimately engage ramp surface 36 in cavity 34. This prevents the strap 16 from being removed due to a force in the opposite direction. Cable 76 is then held tightly by the loop formed by strap 16 and held in position by protrusions 62. If desired, after the article has been attached to the fastener, the excess portion of strap 16 extending beyond the first rectangular opening 30, can be cut and removed.

As briefly described hereinbefore, the flexible strap support fastener has many applications. It is intended that the applications for use of the flexible strap support fastener are numerous and may include, without limitation, use of a storage/carriage member and fastener in combination. Also, the article to which the fastener can be attached are numerous and include, without limitation, cables, hoses, wires, pneumatic lines, hydraulic lines or the like.

One ideal application is for the geophysical industry in seismic data gathering activity. In such activities, electrical cables with geophones electrically connected thereto, must constantly be layed out on the ground in a certain array and the geophones inserted (or planted) into the ground. After the seismic data is obtained, the electrical cables and geophones must be retrieved, restrung on a holder and transported or stored for the next assignment. The present invention has great utility for such applications, and such combination is shown in FIGS. 10 and 11.

Figure 10:
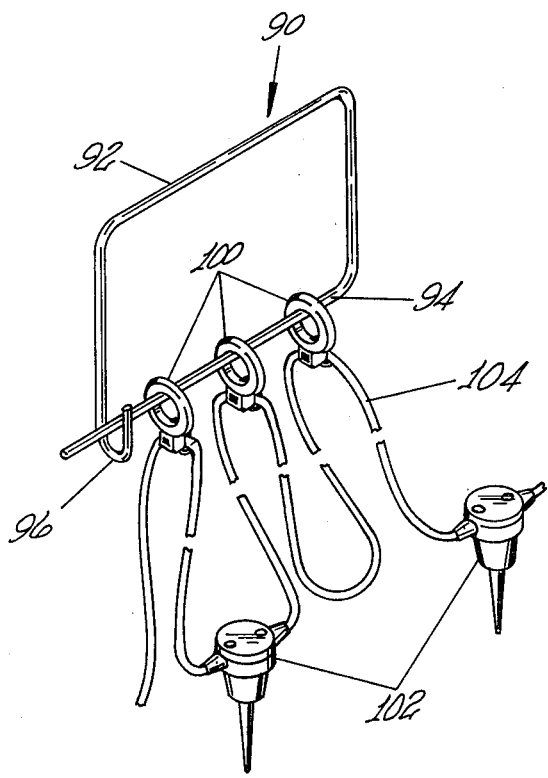
FIG. 10 is a pictorial representation of a cable having geophones attached thereto wherein the fasteners of the present invention are used for storing the cable and geophones on a hasp.
Figure 11:
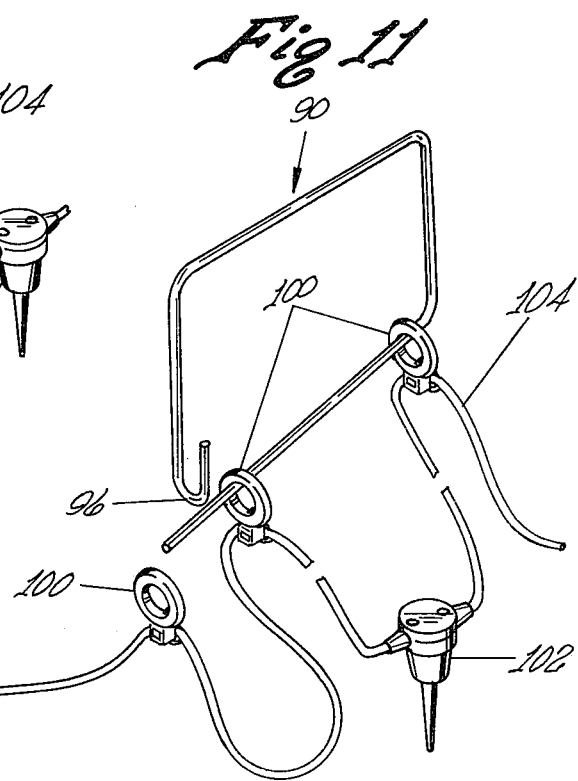
FIG. 11 is a pictorial representation of the hasp, cable with geophones and fasteners when the cable and geophones are payed off the hasp for use in the field.

In FIGS. 10 and 11 a hasp generally shown as 90 is formed of a support member 92 and an elongated wire member 94. The support member 92 terminates at one end in a "U-shaped" clasp 96 which receives and holds one end of the elongated member 94. A plurality of cable ring fasteners 100 are attached to a cable 104 having a plurality of geophones 102 electrically connected to the cable. FIG. 10 shows the hasp 90 and cable connectors 100 in a combination to store the cable 104 and geophones 102 wherein the end of elongated member 94 is inserted into the "U-shaped" clasp 96. This permits storage and carrying of the cable 104 and geophones 102.

FIG. 11 shows the hasp 90 and cable ring connectors 100 in a combination to permit the cable 104, geophones 102 and cable ring fasteners 100 to slide off of the end of elongated member 94 and to be distributed or payed out for use.

When the cable 104 and geophones 102 are to be retrieved, the cable ring fasteners 100 are merely slid back into the elongated member 94 which concurrently, neatly and uniformly coils the cable 104 and stacks the geophones 102.

What is claimed is:

1. A flexible adjustable holding means for fastening an article to a support comprising
   a ring-shaped hanger adapted to be affixed to a support; said ring-shaped hanger including means located at the periphery thereof defining a cavity between a first and second opposed spaced parallel surface with the walls of said cavity forming a first opening in the first surface and a second opening having a smaller cross sectional area than said first opening in the second surface; said cavity having a ramp surface formed on the cavity wall adjacent the ring-shaped hanger;
   a wedge-shaped locking member having means defining a thin end, a thick end, a sloping surface extending on one side between the thin end and thick end and an opposed planar surface having a predetermined transverse width on the other side of the wedge-shaped locking member, said wedge-shaped locking member being adapted to be positioned in said cavity with the thin end thereof extending through said second opening and the thick end thereof extending through said first opening with the sloping surface of the wedge-shaped locking member being in engagement with the cavity wall ramp surface, said wedge-shaped locking member including a plurality of parallel sawtooth-shaped teeth located on the planar surface of the wedge-shaped locking member and extending across the predetermined transverse width of the planar surface and positioned with the angle of the sawtooth-shaped teeth pointed towards the thick end of the wedge-shaped locking member located in said first opening when the wedge-shaped locking member is inserted into said cavity;
   an elongated strip member attached to and extending between and integral with the interior surface of said ring-shaped hanger and the edge of said wedge-shaped member for holding said wedge-shaped member when external to the cavity adjacent the ring-shaped hanger, said elongated strip member being of sufficient length to permit said wedge-shaped member to be inserted into said cavity;
   an elongated flexible strip member having one end thereof affixed to the cavity defining means between said first and second opening and the other end thereof being free, said strip member having a width greater than the predetermined transverse width and the surface facing the first opening including means for defining an elongated recessed central area having a width of a sufficient dimension to receive and mate with the planar surface of the wedge-shaped locking member and extending lengthwise in said strip member and a plurality of parallel sawtooth-shaped teeth extending across the width of the surface of the recessed central area of said strip member surface and positioned with the angle of the sawtooth-shaped teeth pointed toward the first opening; and
   a plurality of spaced elongated gripping protrusions positioned on the outer surface of the cavity defining means on said ring-shaped hanger and extending between the edge of the second opening to the edge of the cavity defining means adjacent the fixed end of the strip member, said free end of the strip member being adapted to be inserted into the second opening, through the cavity between the sawtooth-shaped teeth formed on the wedge-shaped locking member planar surface and the adjacent cavity wall, and out of said first opening, said strip member being adapted to have an article located in a loop formed by said strip member and gripped by said gripping protrusions as the strip member is pulled through said cavity and tightened around an article causing the sawtooth-shaped teeth on the surface of the recessed central area of the strip surface to unidirectionally engage, mate with and slide over the sawtooth-shaped teeth on the wedge-shaped locking member's planar surface positioned in said recessed central area in response to a force pulling the strip member through said first opening and to engage and lock against the sawtooth-shaped teeth on the wedge-shaped locking member's planar surface and to urge the sloped surface against the ramp surface in response to a force pulling in an opposite direction and the flat surfaces thereof lock together pushing the wedge-shaped sloping surface against the ramp surface in response to a force in the opposite direction preventing relative movement between the wedge-shaped locking member and strip member.

2. The flexible adjustable holding means of claim 1 wherein the wedge-shaped locking member's thin end terminates in a lip which engages the edge of the second opening to retain the wedge-shaped locking member in the cavity.

3. In combination,
means for supporting an electrical cable including means defining a rigid elongated member;
an electrical cable adapted to be stored on and distributed from said support means; and
a plurality of cable ring fasteners mounted at predetermined intervals to said electrical cable and adapted to have said ring fasteners slideably placed on said rigid elongated member to store said electrical cable and to be slideably removed from said rigid elongated member to distribute said electrical cable, each of said cable ring fasteners comprising
a ring connector having an opening therein to receive said rigid elongated member, said ring connector having a pad formed on said ring connector at one point along the periphery thereof, said pad having a first and second opposed parallel surface having a cavity extending therebetween which forms a first rectangular opening in said first surface, a ramp surface on the inner cavity wall adjacent the ring and a second smaller rectangular opening in the second surface;
a wedge-shaped locking member positioned within the cavity and having a thin end, a thick end, a sloping surface and a planar surface having a predetermined transverse width and a plurality of parallel sawtooth-shaped teeth extending thereacross and pointed toward the thick end of the locking member;
a flexible connector of a selected length extending between and integral with the interior surface of the ring connector and the wedge-shaped locking member positioned within the cavity;
an elongated strap having a width greater than the predetermined transverse width and a recessed central area of a sufficient dimension to receive and mate with the planar surface of the wedge-shaped locking member and extending lengthwise in said strap and a plurality of parallel sawtooth-shaped teeth formed across the surface of the recessed central area and having one end of the strap rigidly attached to the pad on the surface opposite the surface of the pad attached to the ring periphery; and
a plurality of elongated gripping protrusions located on the pad of each cable ring fastener and extending between the edge of the first rectangular opening toward the end of the strap attached to the pad;
said fixed end of the strap being positioned between the first rectangular opening and the second rectangular opening with the recessed central area surface having the teeth located facing and pointing at said first opening and the other end of the strap inserted into and pulled through the cavity to form a tight loop with the strap against the electrical cable and with the teeth of the wedge-shaped locking member in locking engagement against the teeth formed on the surface of the recessed central area to urge the sloping surface of the wedge-shaped locking member tightly against the ramp surface of the cavity to maintain the strap in tight engagement with the cable and to urge said gripping protrusions into gripping relationship with the electrical cable in response to the tight loop formed by the strap to prevent slippage of the cable in the strap loop.

4. The combination of claim 3 wherein said supporting means includes
a hasp formed of an elongated wire member which cooperates with a closing member for storing and distributing an electrical cable; and wherein
said cable ring fasteners mounted to the electrical cable are adapted to have their ring connector slide onto the elongated wire member to store the electrical cable on the hasp and to slide from the elongated wire member to remove the cable from the hasp.

5. The combination of claim 3 wherein the wedge-shaped locking member's thin end terminates in a lip which engages the edge of the second opening to retain the wedge-shaped locking member in the cavity.

6. A flexible strap support fastener comprising
a hanger ring having a rectangular shaped pad attached thereto at one location on the periphery of said hanger ring, said pad including a first and second opposed spaced parallel surface and means extending therebetween defining a cavity extending axially therethrough along a path substantially parallel to the axis of the hanger ring and intercepting said first surface in a first rectangular shaped opening and said second surface in a second smaller rectangular shaped opening with the interior cavity wall located adjacent the axis of the hanger ring and extending between the first rectangular opening and the second rectangular opening being a ramp surface, said pad having a plurality of elongated gripping protrusions located on the outer surface of said pad adjacent the outer edge of the second rectangular opening and extending in a direction substantially perpendicular to the axis of the hanger ring;
a wedge-shaped locking member having a thick end, a thin end, a predetermined transverse width and at least one sloping surface adapted to have the thin end thereof inserted into said first rectangular opening and through the cavity of said pad positioning the sloping surface of said wedge-shaped locking member into slideable engagement with the ramp surface formed by the interior wall of the cavity of said pad, said wedge-shaped locking member having a plurality of parallel teeth located on a planar surface thereof opposite said sloping surface with said teeth extending across the transverse width of the planar surface and extending therefrom at an angle toward the thick end of said wedge-shaped locking member;
a flexible connector of a selected length extending between and integral with the interior surface of the hanger ring and the wedge-shaped locking member for holding the wedge-shaped locking member when external to the cavity adjacent the hanger defining means, said flexible connector selected length being sufficient to permit said wedge-shaped member to be inserted into said cavity; and a flexible strap joined to the pad at the outer edge of the second rectangular opening and adjacent the parallel protrusion members and having a width greater than the predetermined transverse width, said strap having a recessed central area of a sufficient dimension to receive and mate with the planar surface of the wedge-shaped locking member and extending lengthwise in said strap and a plurality of parallel teeth extending across the width of the surface of the recessed central area of the strap surface facing the first rectangular opening in the pad and extending therefrom at an angle toward said pad;

said strap being adapted to have the end thereof looped around said pad, inserted into said second rectangular opening in said pad, passing between said planar surface having the teeth thereon and the adjacent inner surface defining the cavity and out through said first rectangular opening, said strap being further adapted to be pulled through said opening causing the teeth on the surface of the recessed central area of the strap to unidirectionally engage, mate with and slide over said teeth on the planar surface in response to a force pulling the strap through said first rectangular opening and to engage and lock against said teeth on the planar surface urging the sloping surface tightly against the ramp surface in response to a force pulling the strap in an opposite direction.

* * * * *